(12) United States Patent
Hilleman

(10) Patent No.: US 7,192,077 B1
(45) Date of Patent: Mar. 20, 2007

(54) VEHICLE DRAG REDUCTION WITH AIR SCOOP VORTEX IMPELLER AND TRAILING EDGE SURFACE TEXTURE TREATMENT

(76) Inventor: Terry B. Hilleman, 1911 Knollwood Dr., Marshalltown, IA (US) 50158

( * ) Notice: Subject to any disclaimer, the term of this patent is extended or adjusted under 35 U.S.C. 154(b) by 0 days.

(21) Appl. No.: 10/446,946

(22) Filed: May 28, 2003

Related U.S. Application Data

(60) Provisional application No. 60/383,733, filed on May 28, 2002, provisional application No. 60/433,877, filed on Dec. 17, 2002.

(51) Int. Cl.
B60J 9/04 (2006.01)
(52) U.S. Cl. .................................. 296/180.1
(58) Field of Classification Search ............ 296/180.1, 296/180.2, 180.3, 180.4, 180.5; 180/903
See application file for complete search history.

(56) References Cited

U.S. PATENT DOCUMENTS

| | | | | |
|---|---|---|---|---|
| 3,951,445 A * | 4/1976 | Tatom | ................... | 296/180.3 |
| 3,971,586 A * | 7/1976 | Saunders | ................. | 296/180.4 |
| 4,316,630 A * | 2/1982 | Evans | ..................... | 296/180.2 |
| 4,357,045 A * | 11/1982 | Kinford, Jr. | ............. | 296/180.2 |
| 4,375,898 A * | 3/1983 | Stephens | ................. | 296/180.3 |
| 4,384,630 A * | 5/1983 | Steiner | ....................... | 180/7.1 |
| 4,518,188 A * | 5/1985 | Witten | ..................... | 296/180.2 |
| 4,653,788 A * | 3/1987 | Di Giusto | ................... | 293/117 |
| 4,678,118 A * | 7/1987 | Fukami et al. | ......... | 237/12.3 B |
| 4,706,910 A * | 11/1987 | Walsh et al. | ................. | 244/130 |
| 4,773,692 A * | 9/1988 | Schleicher et al. | ...... | 296/180.5 |
| 4,951,994 A * | 8/1990 | Miwa | ....................... | 296/180.1 |
| 5,000,508 A | 3/1991 | Woods | | |
| 5,108,145 A * | 4/1992 | Harris | ..................... | 296/180.1 |
| 5,199,762 A * | 4/1993 | Scheele et al. | ........... | 296/180.1 |
| 5,280,990 A | 1/1994 | Rinard | | |
| 5,317,880 A * | 6/1994 | Spears | ........................ | 62/239 |
| 5,348,366 A | 9/1994 | Baker et al. | | |
| 5,908,217 A | 6/1999 | Englar | | |
| 6,170,904 B1 * | 1/2001 | Schaedlich et al. | ...... | 296/180.1 |
| 6,257,654 B1 | 7/2001 | Boivin et al. | | |
| 6,382,708 B1 * | 5/2002 | Erdelitsch et al. | ....... | 296/180.5 |
| 6,595,578 B1 * | 7/2003 | Calsoyds et al. | ......... | 296/180.4 |
| 6,886,882 B2 * | 5/2005 | Farlow et al. | ............ | 296/180.4 |
| 2002/0021022 A1 * | 2/2002 | Erdelitsch et al. | ....... | 296/180.1 |
| 2004/0075298 A1 * | 4/2004 | Wong et al. | ............. | 296/180.2 |

\* cited by examiner

*Primary Examiner*—H Gutman
(74) *Attorney, Agent, or Firm*—McKee, Voorhees & Sease, P.L.C.

(57) ABSTRACT

An improved air scoop device utilizes vortex loops to reduce drag. The apparatus includes a sliding self-retracting portion having a scoop intake, a first chamber area and curved rear deflector with exhaust. The vortex loops connect the curved deflector area with the intake area. The vortex impeller apparatus also has a base plate portion, with a stop and springs. It is mounted at the truck trailer rear end. The base plate portion of the apparatus supports the sliding portion. The moving truck causes the sliding portion to extend back beyond the base plate and trailer's rear. The apparatus' exhaust ventilates the low-pressure area behind the moving truck trailer. When the truck stops, springs or compression pistons retract the sliding portion back over the base plate. In this retracted position, the apparatus fits flush. Variable surface texturing may be applied to the impellers and truck trailer's rounded trailing edges.

12 Claims, 6 Drawing Sheets

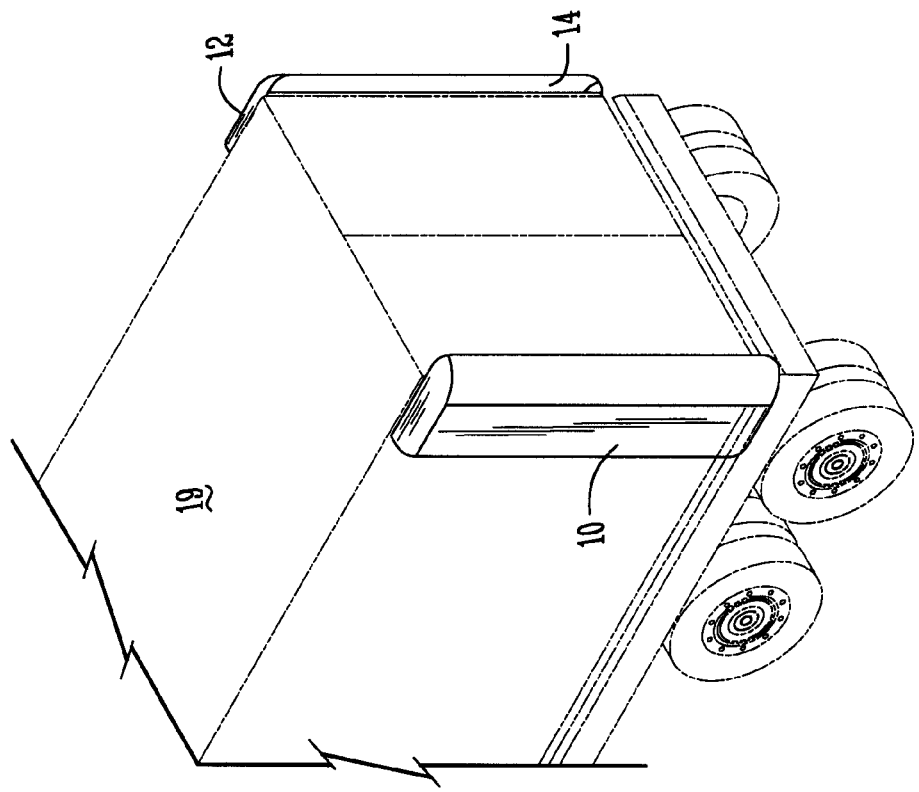
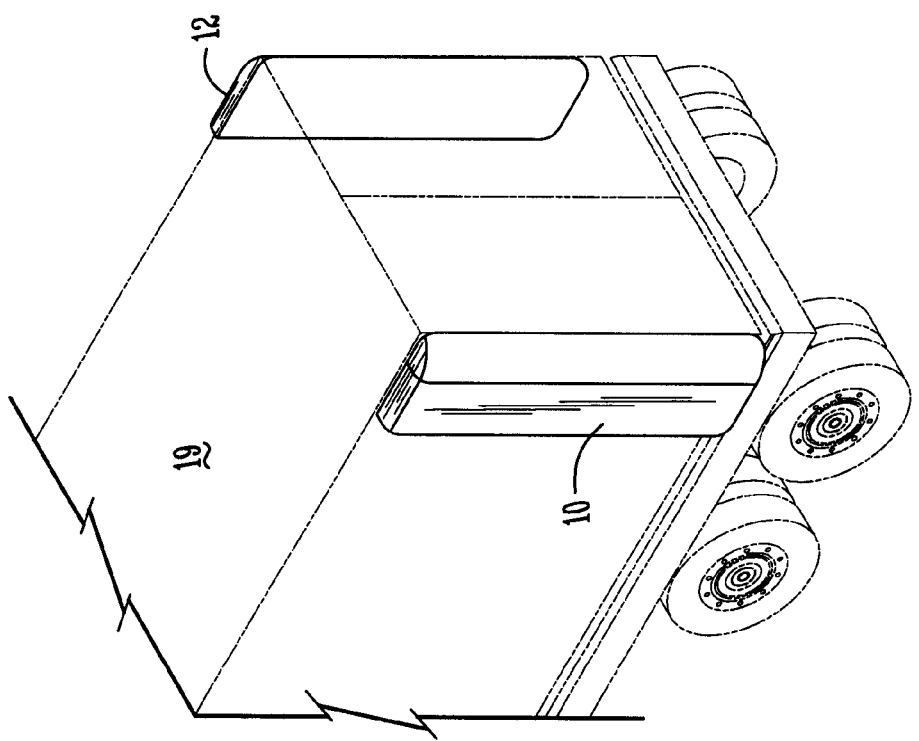

VEHICLE DRAG REDUCTION WITH AIR SCOOP VORTEX IMPELLER AND TRAILING EDGE SURFACE TEXTURE TREATMENT

CROSS-REFERENCE TO RELATED APPLICATIONS

This application is a related to and claims benefit of, Provisional Patent No. 60/383,733 filed May 28, 2002, Provisional Patent No. 60/433,877 filed Dec. 17, 2002, and patent application Ser. No. 10/164,730 filed Jun. 6, 2002.

BACKGROUND OF THE INVENTION

1. Field of the Invention

The present invention relates to a system for controlling the aerodynamics of a ground vehicle. More specifically, the present invention relates to a system that efficiently blows air into the trailing suction area, to improve the aerodynamics of the ground vehicle and a trailing edge treatment.

2. Problems in the Art

All objects that move through air will encounter resistance that increases markedly with speed. Even though it greatly affects all land vehicles, air resistance is most difficult to manage in the trucking industry. Automobiles can be streamlined. Buses can be streamlined. Trains can be streamlined. Almost any vehicle can be streamlined and this is the most efficient way of reducing air resistance. However, trucks are difficult to streamline due to the boxy nature of the trailer that carries the cargo. Increased air resistance translates to inefficient movement, increased fuel consumption, and increased transportation cost.

Recently there has been progress with streamlining the frontal area of the truck. Notably, almost all new semi tractor-trailer trucks have a wind deflector, incorporated above the cab, that directs the air up and over the trailer as the truck moves along the road, these wind deflectors have done much to streamline the front of semi tractor-trailer trucks. Smaller straight trucks are beginning to use a "nose cone" type of wind deflector on the front of the trailer, above the cab. This device eliminates the flat frontal surface and permits limited streamlining. Efforts to streamline the frontal areas around the fenders, gas tanks, and below the front bumper have also helped reduce moving air resistance.

Side wind problems also increase forward air resistance. If a sideway wind blows between the cab and the trailer, and replaces the decreased air pressure area between the cab and the trailer in a semi tractor-trailer truck, this increased air pressure area mimics the wind resistance problem of trying to push a flat trailer front against the oncoming forward air resistance. Skirts extending backwards from the cab, between the cab and the trailer, help to block the side wind problem. Truckers also try to minimize the size of the space between the cab and the trailer if they have adjustment capability in the fifth wheel connector. Sideway wind also causes problems below the trailer in the wheel-area undercarriage. Skirts extending down below the trailer sides, to cover the wheel-area undercarriage, are used to minimize side wind problems in this area. These skirts have gained limited acceptance, possibly due to concerns about increased risk of tipping sideways in very high side winds.

The sides and tops of the trailers have also been smoothed to minimize moving air resistance. U.S. Pat. No. 5,000,508 by Woods (Wind Drag Reduction Device for Vehicles) discusses a drag reduction unit that comprises an inflatable shell, on the roof of the trailer that has rounded corners and a flat upper surface to reduce air drag; it has applications in open-top trailers. The Bernoulli effect at speed inflates it.

Streamlining the frontal, top, and side areas has reduced forward moving air resistance, helping the trucking industry's concern with air resistance that causes inefficient movement, increased fuel consumption, and increased transportation cost. Streamlining cannot eliminate all air resistance. The large frontal area still creates an area of high-pressure air in front of the moving truck. There is also a low-pressure vacuum-like "suction" area behind the moving truck (trailer), which pulls it backward and slows forward progress. The suction is due to the pressure differential between the large front pressure wave and the large vacuum-like area of lower pressure behind the trailer. This area of lower pressure is generated by the truck's (and trailer's) passage through the air, creating a void behind it. Raising the air pressure in the vacuum-like "low pressure wake" will increase the pressure behind the truck, which will reduce the pressure differential, thereby reducing the suction drag intensity. Reducing the size of the height and width dimensions of the "low pressure wake" (vacuum) would also result in a decreased drag magnitude. There have been attempts to modify the size and intensity of the vacuum-like suction drag area behind the trailer on a moving truck.

U.S. Pat. No. 5,908,217 by Englar (Pneumatic Aerodynamic Control and Drag-Reduction System for Ground Vehicles) proposes using a compressor to discharge small amounts of air at the rear portion of the vehicle. Numerous sensors and valves enable rolling and yawing moments to supplement control of aerodynamics. It requires energy to power the system which compromises overall system efficiency and complicates the suction drag solution with maintenance considerations.

U.S. Pat. No. 5,280,990 by Rinard (Vehicle Drag Reduction System) suggests a vehicle drag reduction system of many components. It has a vehicle-mounted nosecone, deflecting air between the trailer and the tractor. Trailer side skirts for the undercarriage area are also included. Previously discussed, the nose cone, and to some extent, the side skirts have some success in the industry. Vertical vanes that scoop and deflect air sideways behind the truck help to manage rear suction drag. The vertical air scoop vanes are mounted at the rear corners by spring biased supports, to allow opening rear doors and restoring the deflecting positions upon closing. However, because trucks often back up to a dock to load and unload from the rear of the trailer, using doors that open to the full trailer dimension, modifications to this area have met with limited acceptance. Transverse upper and lower scoops deflect air up and down the rear surface. Both scoops are fabricated from a resilient material to allow compression against a loading dock structure. Both the rear scoops and vertical vane deflectors create a significant wind drag profile of their own to overcome the suction drag, creating questionable benefits and acceptance.

U.S. Pat. No. 5,348,366 by Baker (Drag Reduction Device for Land Vehicles) consists of large rectangular plates mounted to the after-end of a truck trailer. The plates are smaller than the trailer cross-section and are supported by hinged truss assemblies on the truck frame. The plates are parallel to the truck trailer's rear end. While the vehicle is moving, a vortex becomes locked between the rear of the trailer and the plates, creating a low-pressure region. The suction created changes air flow patterns behind the vehicle to reduce drag. The device is retractable to permit loading.

U.S. Pat. No. 6,257,654 B1 by Boivin (Air Drag Reduction Apparatus) incorporates a vertical plate boat-tail system behind the rear of the trailer that is moved when the doors open. In a way, this and the preceding systems are both a type of boat-tail as they do not require energy input or create additional drag. However, trucker acceptance depends upon the trucker's willingness to relocate the rear-plate systems before backing to load or unload.

Therefore, prior art systems are inconvenient or consume significant energy of their own to operate, minimizing benefit. There is a need for a rear drag reduction system that does not require expending energy running a compressor, or expending energy creating significant additional drag in the process. There is also a need for a rear drag reduction system that does not require the inconvenience of relocating behind-the-trailer wind deflection plates.

FEATURES OF THE INVENTION

A general feature of the invention is the provision for an improved device to reduce rear suction which overcomes problems found in the prior art.

A feature of the invention is improved ventilation of the rear suction area which does not require expenditure of energy to run a compressor or another machine.

A further feature of the invention is the elimination of complicated and expensive installation and maintenance.

An additional feature of the invention is an improved design and function that permits operation of a rear suction ventilator without the inconvenience of moving rear plates for loading and unloading.

Still another feature of the invention is a self-retracting rear ventilating system that permits a flush fit with the rear of the trailer and the docking area.

A further feature of the invention is the provision of improved ventilation of the rear suction area, which does not have a significant adverse affect on wind drag profile.

Yet another feature of the invention is the provision of a vortex-loop impeller that acts much like a compressor, yet seemingly provides its own energy, through its design.

Still further feature of the invention is the provision of an air scoop to ventilate the rear suction area that has negligible drag, due to the vortex-loop engine powering the air scoop.

Still yet is another feature that involves texturing and/or variation in texturing of the trailing edges, in order to reduce the dimensions of the suction area.

These, as well as other features and advantages of the present invention, will become apparent from the following specifications and claims.

SUMMARY OF THE INVENTION

The invention is directed to a vortex-powered air scoop system on the top, sides and/or bottom of a truck trailer, located towards the rear end of the trailer. The device has potential use in any land vehicle where rear suction drag is a concern. The device may be one top unit covering part or all of the rear trailer width dimension; it may be a bottom unit, covering less than the trailer width dimension; it may run the full vertical height along the back side of the trailer's rear; it may be a small module or series of small modules along each side of the trailer, located in various positions (such as on the corners or anywhere along the rear periphery); it may be in any combination thereof.

As the truck increases in speed, the increasing air pressure moves the rear scoop(s) back to a stop, projecting a portion of the scoop past the trailer's rear. The scoop exhaust is now open to channel air into the area behind the truck. This permits the curved area in the back of the scoop to deflect air, coming from the scoop intake, out the exhaust into the low-pressure vacuum-like area. As the truck speed increases further, ventilation increases, forcing even more air into the suction-like low-pressure wake. At this point, with an even greater increase of air movement in the curved deflector, the vortex loop impeller powers up. The scoop contains communication nozzles within its structure that run from the larger high-pressure area of the curved deflector, to a narrow low-pressure area just beyond the front intake of the scoop, to create a vortex effect. The narrow low-pressure area is caused by the intake's constriction generating higher velocity airflow beyond the narrowing, demonstrating the Bernoulli effect. The vortex loop not only reduces drag from pressure buildup within the scoop, but it increases kinetic energy and acts as an impeller to increase air speed in the scoop, without further increase in power from truck acceleration. This results in a much higher ventilation rate of the suction area, without increased expenditure of energy. When the truck speed decreases, springs or compression pistons return the scoop(s) to the resting retracted position, flush with the rear end. Thus the retractable air scoop, combined with vortex impeller loops, overcomes the shortcomings of the prior art.

Drag can also be reduced by modifying the rear edges of the trailer (or vehicle) to duplicate the patterns of a golf ball. The same drag reducing techniques are preferably applied to the rear section of the air scoop.

BRIEF DESCRIPTION OF THE DRAWINGS

FIGS. 1A and 1B are views of the rear of a truck, with a non-working retracted vortex impeller apparatus on the left (1A) and a working extended vortex impeller apparatus on the right (1B).

DETAILED DESCRIPTION OF THE PREFERRED EMBODIMENT

Figures 2, 3:
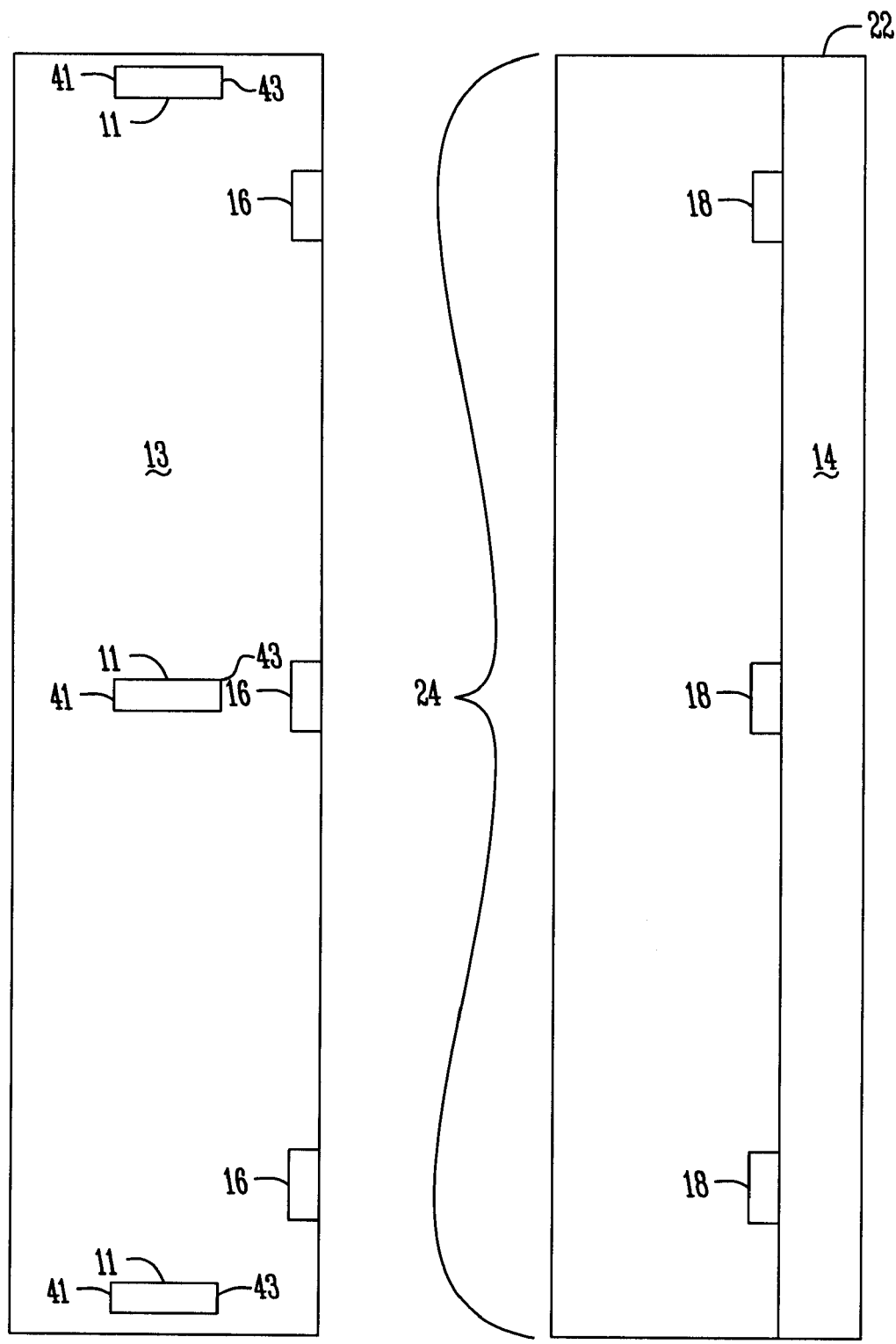
FIG. 2 is a view of the base plate portion of the vortex impeller apparatus, with stops, according to principles of the invention.
FIG. 3 is a bottom view of the sliding portion of the vortex impeller apparatus, with base plate stop notches.
Figure 4:
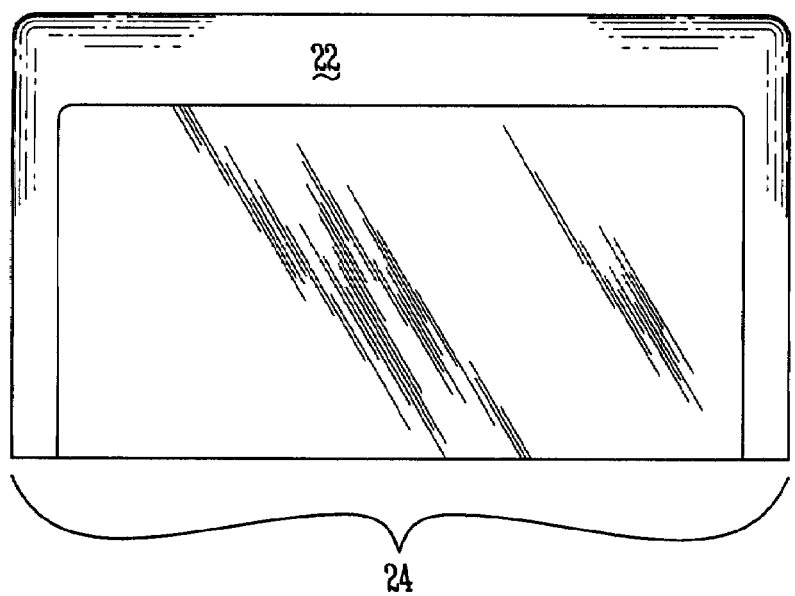
FIG. 4 is a top aspect view of the sliding portion of the vortex impeller apparatus.
Figure 5:
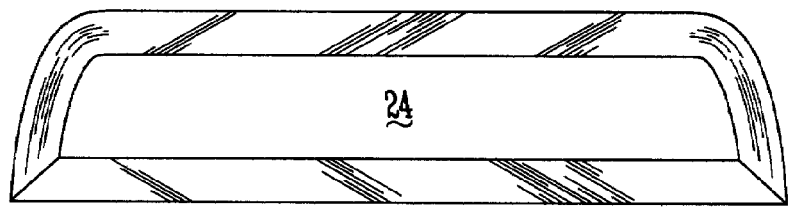
FIG. 5 is a front aspect view of the sliding portion of the vortex impeller apparatus.
Figure 6:
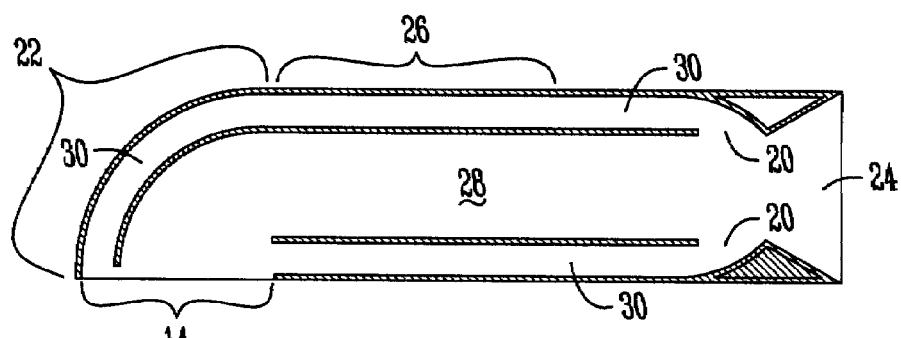
FIG. 6 is a side-aspect cross sectional view of the sliding portion of the vortex impeller apparatus, illustrating vortex loops and air scoop chamber.
Figure 7:
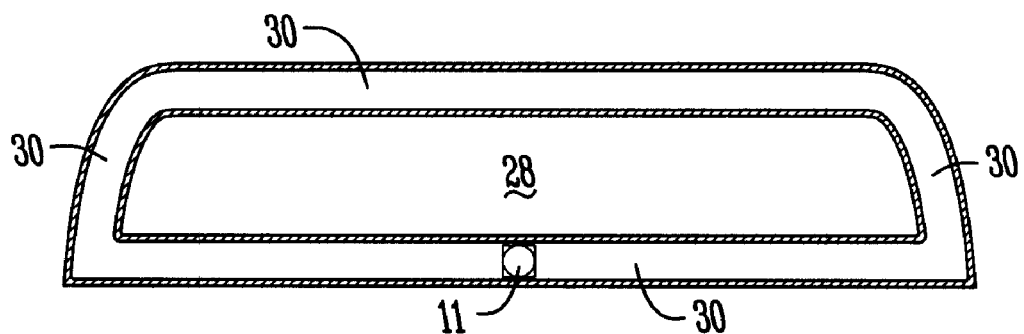
FIG. 7 is a frontal mid-aspect cross sectional view of the sliding portion of the vortex impeller apparatus, illustrating vortex loops.
Figure 8:
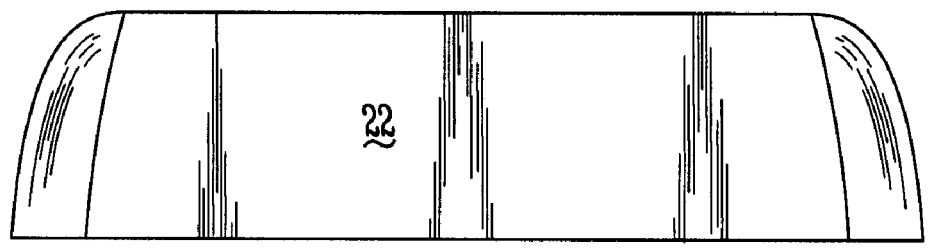
FIG. 8 is a rear aspect view of the sliding portion of the vortex impeller apparatus.
Figure 9:
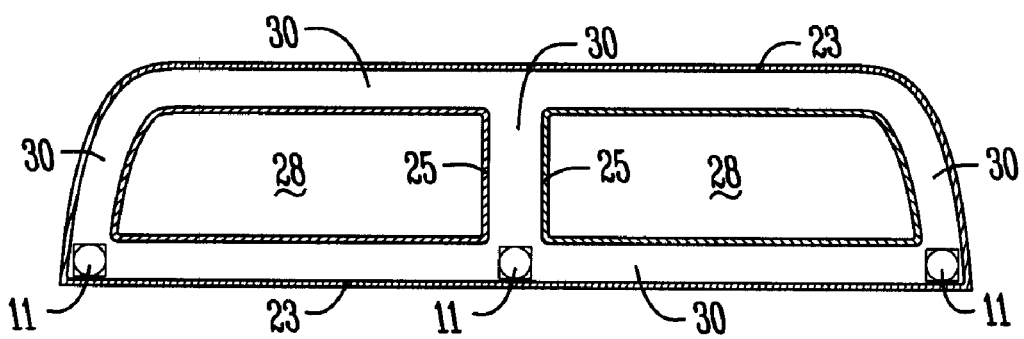
FIG. 9 is a frontal mid-aspect cross sectional view of the sliding portion of the vortex impeller apparatus, illustrating vortex loops in an alternate embodiment.

The present invention will be described as it applies to its preferred embodiment. It is not intended that the present invention be limited to the described embodiment. It is intended that the invention cover all modifications and alternatives, which may be included within the spirit and scope of the invention.

FIG. one is a typical semi tractor-trailer vehicle rear end. One vortex impeller apparatus (base and sliding portion) is mounted on each side of the trailer, at the rear end. In FIG. 1A the left vortex impeller apparatus 10 is in the retracted position with the base plate springs (not shown) pulling the sliding section of the vortex impeller apparatus directly over the base plate portion of the vortex impeller apparatus, and flush with the back of the non-moving truck. This permits normal rear trailer door function and easy loading and/or unloading.

In FIG. One B on the trailer rear is an extended vortex impeller apparatus 12, with the sliding portion exposing the vortex impeller exhaust (area 14), which ventilates the rear vacuum-like suction area behind the moving truck. In the extended mode (shown in FIGS. one, two and three), the moving truck generates air pressure in the scoop, forcing the sliding portion of the vortex impeller apparatus backwards. This action opens the exhaust area 14, engages the base plate stop 16 in the sliding portion's notch 18, and loads the twin retracting springs (not shown), running from the front of the base plate to the rear of the sliding portion.

FIG. two is a view of the base plate 13 portion of the vortex impeller apparatus, with stop 16; it supports the sliding portion of the vortex impeller apparatus, preventing overextension of the sliding portion, and it is attached to the side of the trailer in this preferred embodiment. One or more springs 11 including two securable ends 41 and 43 may be secured as desired on base plate 13.

FIG. three is a bottom view of the sliding portion of the vortex impeller apparatus, with base plate stop notch 18; it approximates the base plate. It is held in place by the base plate and springs; however, the previously discussed back and forth sliding movement of this portion is permitted. Springs 11 can be replaced within the other spring like device, such as a compression cylinder or piston. The large exhaust area 14 is exposed with rearward movement of the sliding portion. Rail guides (not shown) permit rearward movement of the sliding portion and firmly lock the sliding portion to the base plate.

FIG. four is a top aspect view of the sliding portion of the vortex impeller apparatus. With the exception of the intake 24, the sides and back 22 are rounded into a curved shape; this streamlines the profile and minimizes vortices at the trailer corners. The exhaust area 14 is not visible below the curved area 22 in FIG. four; however, its location is indicated in the opposite perspective in FIG. three.

FIG. five is a front aspect view of the sliding portion of the vortex impeller apparatus; the leading edge tapers inward, slightly compressing and accelerating the air as it enters intake 24. The low-pressure area of the vortex loop exhaust 20 is just beyond the taper; however, it is not visible in this view.

FIG. six is a side-aspect cross sectional view of the sliding portion of the vortex impeller apparatus, illustrating vortex loop chambers 30 and air scoop chamber 28. The vortex loop chambers 30 carry higher-pressure air from the curved area of the scoop 22, forward, to the higher-velocity lower-pressure area near intake area 24. The air in chambers 30 (exiting opening 20) flows in a direction opposite that of the flow in the scoop chamber 28. It is the reverse circular airflow pattern that comprises the vortex. This circular pattern of airflow pulls additional air into the intake 24, creating a self-perpetuating powerful, air engine that is relatively drag-free. Intake 24 leads into the narrower air scoop chamber 28; the vortex loop exhausts 20 are located just beyond the constriction of intake 24, where the scoop chamber 28 begins. The exhausts 20 empty the counter flowing air from chambers 30, mixing with the high-velocity air in chamber 28, generating a powerful supplemental flow that pulls additional air into intake 24. The mid-aspect portion of the air scoop 26 comprises the middle portion of the air scoop between the intake 24 and the curved portion 22, with exhaust 14 underneath.

FIG. seven is a frontal mid-aspect cross sectional view of the sliding portion of the vortex impeller apparatus, illustrating vortex loop chambers 30. Springs 11 or compression cylinders 11 may be added as desired to intrude as little as possible into the vortex loop chambers 30.

FIG. eight is a rear aspect view of the sliding portion of the vortex impeller apparatus. Inside, underneath the curved portion 22 of the air scoop, the vortex loops begin, channeling higher-pressure air forward through the vortex loop chambers 30 (FIG. six), towards the lower-pressure vortex loop terminus 20, which is adjacent to the air scoop intake 24 (FIGS. rive and six). The curved portion of the sliding vortex impeller apparatus 22 terminates as the rear wall of the air scoop exhaust opening 14. The exhaust from opening 14 (FIGS. one, three and six) ventilates the vacuum-like low-pressure suction area behind the moving truck.

Figure 10B:
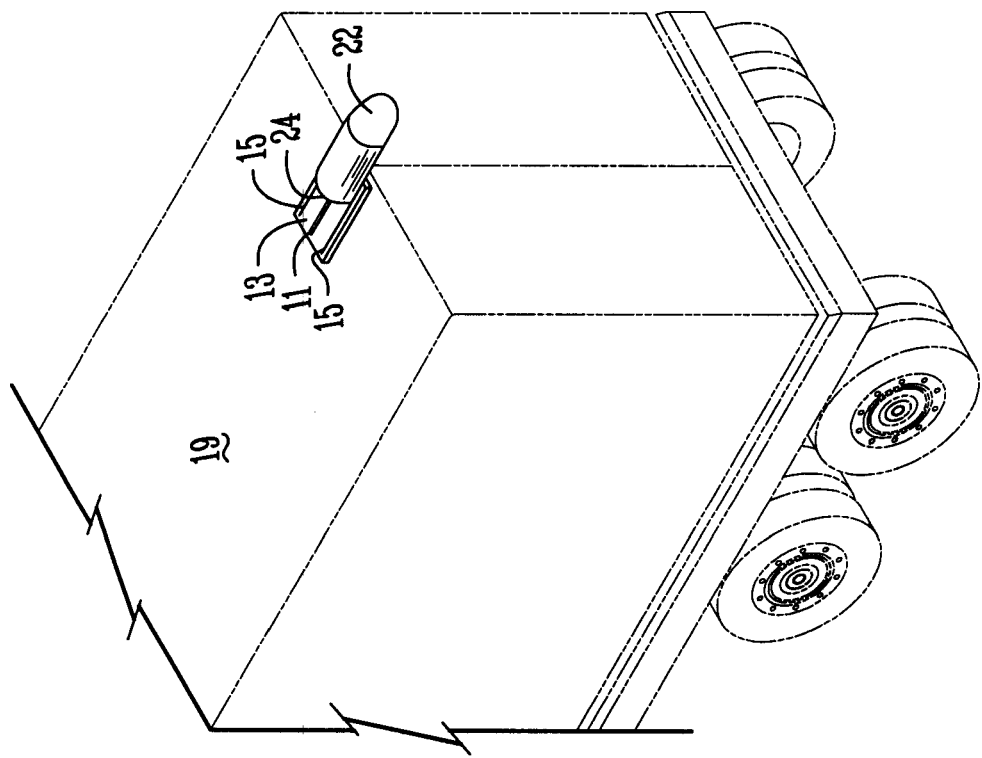
FIGS. 10A and 10B are yet another alternate embodiments in the form of a small semi-circle on the top of the trailer.
Figure 10A:
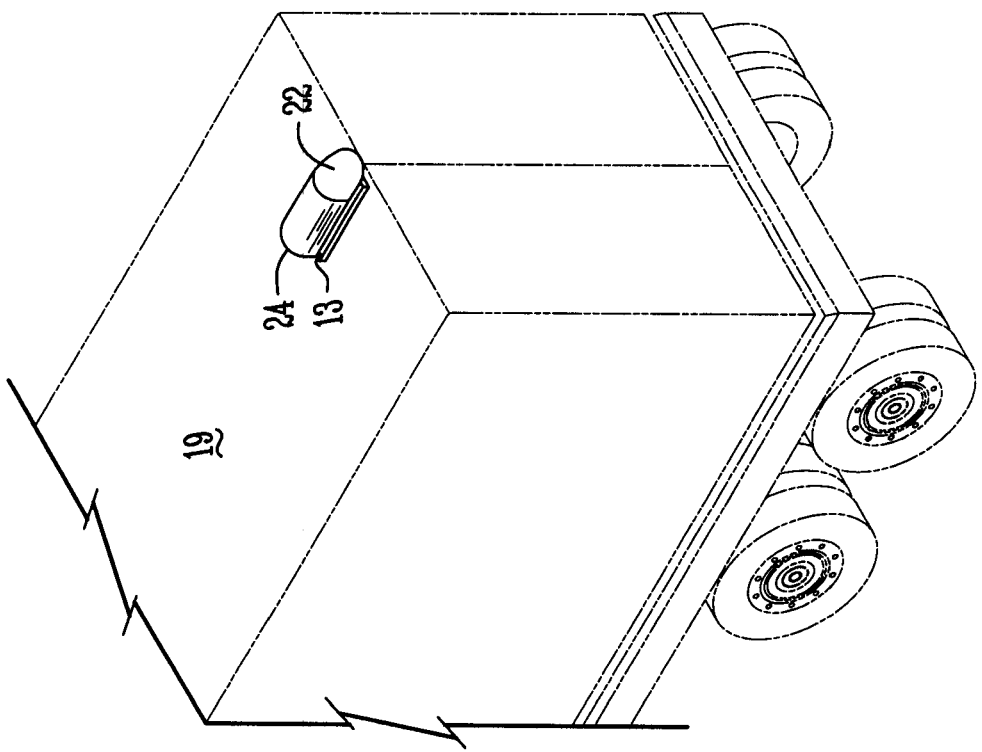
Figure 11C:
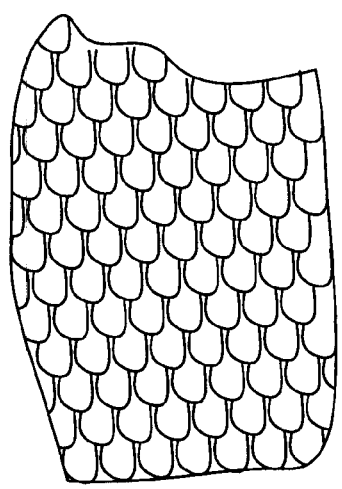
FIG. 11 contains examples of surface texturing that may be used on the trailing edges; these may be varied in size as they progress around the curve.
Figure 11B:
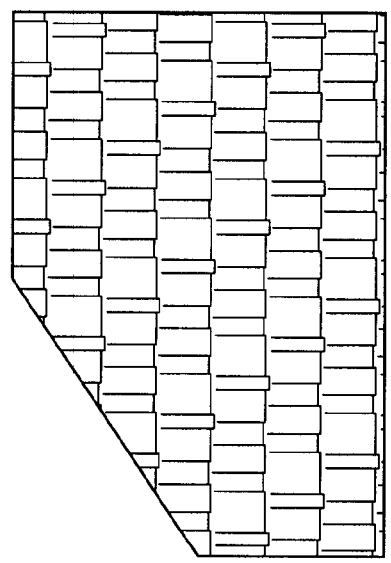
Figure 11A:
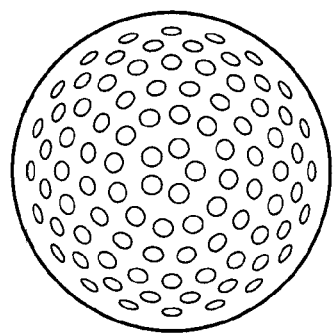

An alternate embodiment could allow two or more sectional vortex air scoop modules on the base plate(s), as shown in the FIG. nine frontal mid aspect transverse cross section. Generally, the vortex impeller apparatus 22 is comprised of an outer wall 23 and an inner wall 25. FIGS. 10A and 10B are another alternative embodiment, comprised only of a small half-circle shaped impeller 22 on the top or outer wall 19 of the trailer. As shown in FIGS. 10A and 10B, the vortex impeller apparatus 22 is secured to the base 13 which is secured to the outer wall 19. On the base 13, are rail portions 15 to which the vortex impeller apparatus 22 and spring 11 are attached. This would offer minimum drag profile, yet significant ventilation of the rear suction area. An additional embodiment could utilize texturing as shown in FIGS. Eleven A–C on the outer rear curved surface of the air scoop to enhance airflow around the back of the air scoop. It would modify turbulence and cause the air to flow further around the curve, behind the scoop itself, to a greater degree. This would help to modify the drag caused by the scoop itself. Perforations in the outer wall may also be utilized.

Adding a surface texture treatment on the rounded trailing edges of the vehicle, examples of which are shown in FIG. Eleven A–C, could further reduce drag. This surface texturing can be applied to the vehicle surface in the manufacturing process or added-on as a tape. A variety of surface textures can be applied, including a texture that resembles the skin of a shark or the small scales of a fish (11C), texture like shingles on a roof (11B), and texturing similar to the dimples on a golf ball (11A). Texture size variation can still further enhance the effect. For example, as the trailer edge is formed by joining the side and rear portions, rounding this edge and increasing the size of the scales or golf ball-like dimples around the curve will allow the flow of air to follow the surface contour a greater distance around the curve, further reducing the magnitude of the vacuum-like void that creates suction.

This ventilation from the vortex impeller (and the variable surface texturing on the rounded trailing edges) raises the air pressure in the vacuum-like "low pressure wake," which increases the pressure behind the truck, which reduces the intensity of the pressure differential between the front and the back of the truck (that causes the suction drag). Ventilation from the edge texturing on the rear of the trailer reduces the height and width dimensions of the "low pressure wake" (vacuum), also resulting in decreased drag magnitude. This drag reduction reduces air resistance, which translates to more efficient movement, decreased fuel consumption, and decreased transportation cost.

It is believed that all features of the invention are satisfied, such as the provision for an improved device to reduce rear suction, which overcomes problems found in the prior art; an improved ventilation of the rear suction area, which does not require expenditure of energy to run a compressor or another machine; the elimination of complicated and expensive installation and maintenance; an improved design and function that permits operation of a rear suction ventilator without the inconvenience of moving rear plates for loading and unloading; a self-retracting rear ventilating system that permits a flush fit with the rear of the trailer and the docking area; an improved ventilation of the rear suction area, which does not have a significant adverse affect on wind drag profile; the provision of a vortex-loop impeller that acts much like a compressor, yet seemingly provides its own energy, through its design; the provision of an air scoop to ventilate the rear suction area that has negligible drag, due to the vortex-loop engine powering the air scoop; and the utilization of curved rear trailing edge texturing to reduce the dimension of the suction area.

A general description of the present invention as well as a preferred embodiment of the present invention has been set forth above. Those skilled in the art, to which the present invention pertains, will recognize and be able to practice additional variations in the methods and systems described, which fall within the teachings of this invention.

Accordingly, all such modifications and additions are deemed to be within the scope of the invention, which is to be limited only by the claims on a subsequent non-provisional application, which references this provisional application.

What is claimed is:

1. A drag reducing device for a vehicle, the vehicle having a front portion and a rear portion, the device comprising:
    a base secured to the rear portion of the vehicle;
    a moveable air scoop slideably secured to the base; and
    a spring operatively connected to the moveable air scoop and the base.

2. The drag reducing device of claim 1 wherein the air scoop included surface texturing.

3. The drag reducing device of claim 1 wherein the air scoop is moveable from air resistance.

4. The drag reducing device of claim 1 wherein the spring is a compression piston.

5. A drag reducing device for a vehicle, the vehicle having a front portion and a rear portion, the device comprising:
    a ventilator secured to the rear portion of the vehicle wherein the ventilator is moveable by air pressure into an extended position; and
    a spring operatively connected to the ventilator to return the ventilator into a non-extended position.

6. A drag reducing device for a vehicle, the device comprising:
    an outer wall;
    an inner wall wherein the inner wall and outer wall are spaced apart from one another;
    a first chamber through which air flows in one direction;
    a second chamber through which air flows in a second direction; and
    a nozzle operatively connected to the outer wall.

7. The drag reducing device of claim 6 further comprising a base moveably secured to the outer wall.

8. The drag reducing device of claim 6 further comprising surface texturing on the outer wall.

9. The drag reducing device of claim 6 further comprising surface perforations on the outer wall.

10. The drag reducing device of claim 6 further comprising surface texturing on the vehicle.

11. A drag reducing device for a vehicle, the vehicle having a front portion and a rear portion, the device comprising:
    a base secured to the rear portion of the vehicle;
    a moveable air scoop wherein the air scoop includes a vortex loop, the air scoop being slideably secured to the base; and
    a spring operatively connected to the moveable air scoop and the base.

12. A drag reducing device for a vehicle, the device comprising:
    an outer wall;
    an inner wall wherein the inner wall and outer wall are spaced apart from one another;
    a first chamber through which air flows in one direction wherein the first chamber and the second chamber form a vortex loop;
    a second chamber through which air flows in a second direction; and
    a nozzle operatively connected to the outer wall.

* * * * *